(12) United States Patent
Beers

(10) Patent No.: US 11,358,654 B1
(45) Date of Patent: Jun. 14, 2022

(54) BODY PANELS FOR REPAIRING A DAMAGED VEHICLE BODY

(71) Applicant: Jason Beers, Girard, OH (US)

(72) Inventor: Jason Beers, Girard, OH (US)

( * ) Notice: Subject to any disclaimer, the term of this patent is extended or adjusted under 35 U.S.C. 154(b) by 0 days.

(21) Appl. No.: 16/740,636

(22) Filed: Jan. 13, 2020

(51) Int. Cl.
| | |
|---|---|
| *B62D 29/04* | (2006.01) |
| *B23P 6/04* | (2006.01) |
| *B32B 5/02* | (2006.01) |
| *B62D 25/20* | (2006.01) |
| *D03D 15/267* | (2021.01) |

(52) U.S. Cl.
CPC ............ *B62D 29/043* (2013.01); *B23P 6/04* (2013.01); *B32B 5/024* (2013.01); *B62D 25/2063* (2013.01); *D03D 15/267* (2021.01)

(58) Field of Classification Search
CPC .......................... B62D 25/2063; B62D 29/043
USPC ....................................................... 296/181.2
See application file for complete search history.

(56) References Cited

U.S. PATENT DOCUMENTS

| | | | |
|---|---|---|---|
| 2,795,523 A | 6/1957 | Cobb et al. | |
| 3,470,048 A * | 9/1969 | Jones ................. | B21D 39/03 156/94 |
| 4,135,017 A * | 1/1979 | Hoffmann, Sr. ....... | B29C 73/00 156/94 |
| 4,147,576 A * | 4/1979 | Beem ................. | B29C 73/00 156/94 |
| 4,705,716 A * | 11/1987 | Tang ................. | B29C 70/865 442/224 |
| 4,707,391 A * | 11/1987 | Hoffmann, Sr. ... | B62D 25/2063 156/94 |
| 5,342,666 A * | 8/1994 | Ellison ............. | B29C 45/1418 428/174 |
| 5,709,826 A * | 1/1998 | Greenberg ........... | B29C 73/02 156/64 |
| 6,855,652 B2 | 2/2005 | Hable et al. | |
| 7,059,665 B2 * | 6/2006 | Murai ............... | B29C 70/22 296/181.2 |
| 7,140,667 B2 * | 11/2006 | Steinhauser ........ | B60R 21/13 296/181.2 |
| 8,353,995 B2 * | 1/2013 | Stout ................. | B32B 27/08 156/94 |
| 2005/0173010 A1 * | 8/2005 | Schwan ............. | B29C 70/083 138/121 |
| 2006/0163910 A1 * | 7/2006 | Behr ................. | B29C 70/342 296/181.2 |
| 2008/0001429 A1 * | 1/2008 | Willis ............... | B29C 70/305 296/181.2 |
| 2016/0185395 A1 * | 6/2016 | Osten ............... | B62D 29/043 296/181.2 |
| 2017/0043815 A1 * | 2/2017 | Baudry .............. | B32B 27/12 |
| 2017/0069304 A1 * | 3/2017 | Seto ................. | F16F 15/08 |
| 2018/0093713 A1 * | 4/2018 | Nam ................. | B62D 25/105 |
| 2018/0118279 A1 * | 5/2018 | Lee ................. | B62D 21/157 |

(Continued)

*Primary Examiner* — Jason S Morrow

(74) *Attorney, Agent, or Firm* — Sanchelima & Associates, P.A.; Christian Sanchelima; Jesus Sanchelima

(57) ABSTRACT

A body panel for repairing damaged vehicle bodies including a layer assembly. The body panel makes use of a fibrous sheet that includes fiber glass, carbon fiber, or Kevlar that would be easily painted and installed to replace damaged vehicle bodies. The body panel makes great usage for repairing damaged body panels as it is strong and durable as it does not dent, it is lightweight, it is inexpensive, and it importantly does not rust.

13 Claims, 2 Drawing Sheets

(56) References Cited

U.S. PATENT DOCUMENTS

2018/0194908 A1\* 7/2018 Kim .................... B62D 29/043
2019/0351624 A1\* 11/2019 Huang .................... B32B 27/08

\* cited by examiner

BODY PANELS FOR REPAIRING A DAMAGED VEHICLE BODY

BACKGROUND OF THE INVENTION

1. Field of the Invention

The present invention relates to vehicle body panels and, more particularly, to vehicle panels that can be used to repair a damaged vehicle body without the need to weld new metal panels thereon.

2. Description of the Related Art

Several designs for vehicle panels have been designed in the past. None of them, however, include or involve replacing automotive body panels through the sole use of a fibrous sheet that includes fiber glass, carbon fiber, or Kevlar that would be easily painted and installed. More specifically such as an E-glass, fiber glass, Kevlar, or carbon fiber as the sole repairing member when replacing body panels in combination with ease of install and painting.

Applicant believes that a related reference corresponds to U.S. Pat. No. 2,795,523 for a method of repairing automobile sheet metal panels. Another related reference relates to U.S. Pat. No. 6,855,652 for structurally reinforced panels. None of these references, however, teach of using E-glass, fiber glass, Kevlar, or carbon fiber as the sole repairing member when replacing body panels in combination with ease of install and painting.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a body panel that can be used to repair the damaged body of a vehicle.

It is another object of this invention to provide a body panel that is lightweight.

It is still another object of the present invention to provide a body panel that has high durability as the body panel does not dent.

It is another object of the present invention to provide a body panel for repairing of damaged vehicle bodies that can be customized or made to match the existing color of the vehicle body.

It is still another object of the present invention to provide a body panel that does not rust.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
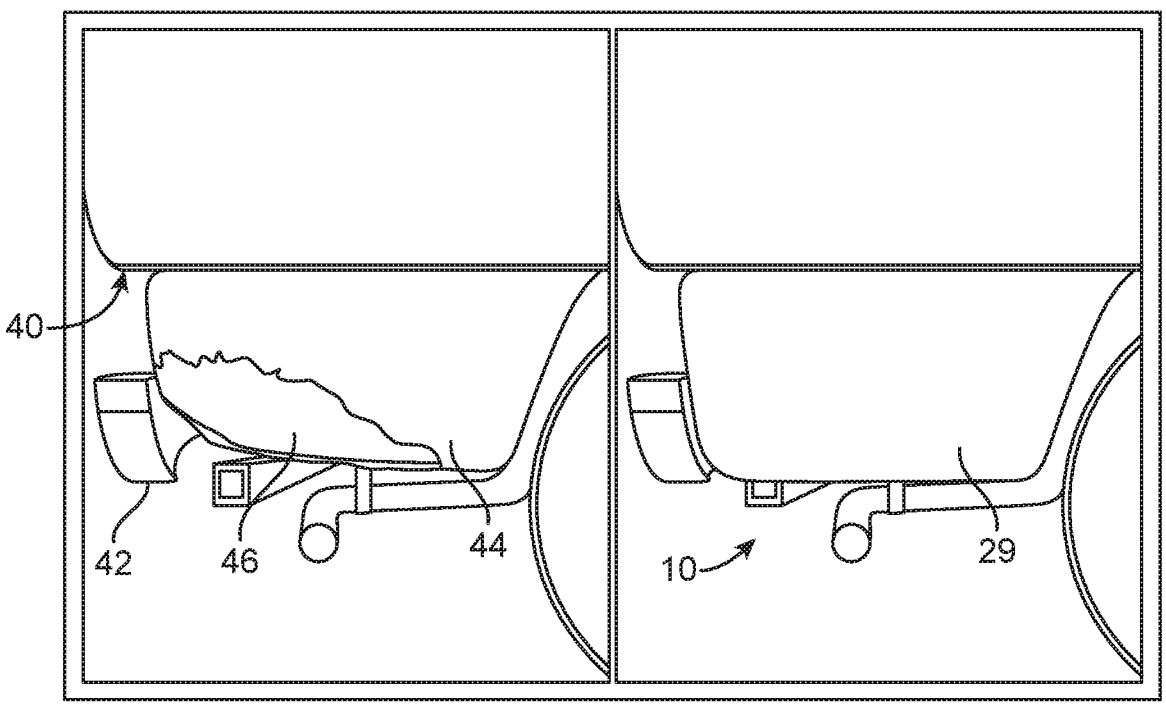
FIG. 1 represents the present invention in an operational setting.
Figure 2:
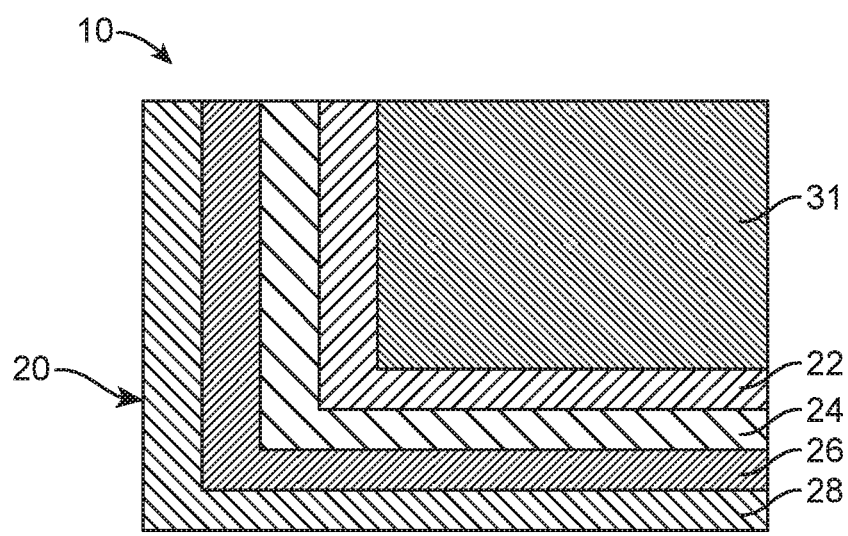
FIG. 2 shows all layers of the present invention stacked on one another.
Figure 3:
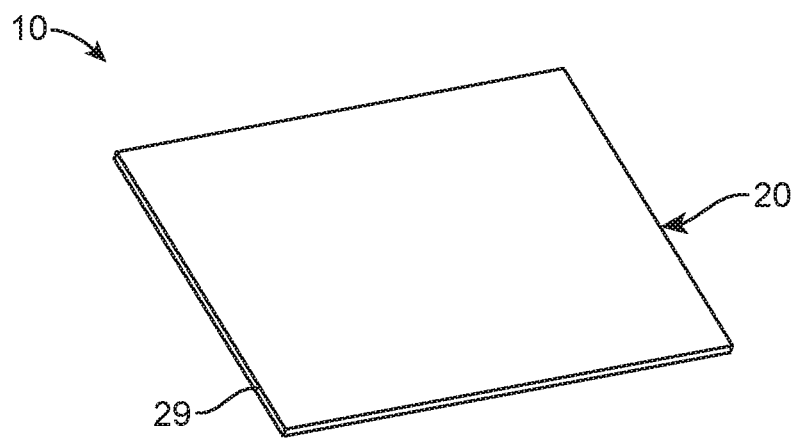
FIG. 3 illustrates the present invention once all layer have been bonded.
Figure 4:
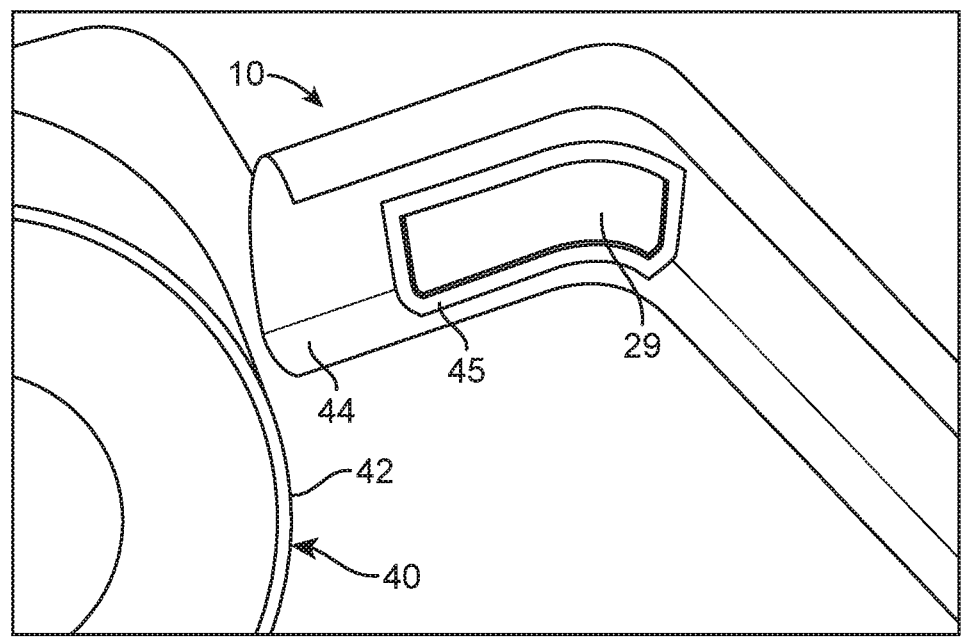
FIG. 4 is a representation of the present invention being mounted to a damaged vehicle body.

Referring now to the drawings, where the present invention is generally referred to with numeral 10, it can be observed that it, body panel 10, basically includes a layer assembly 20 and a vehicle assembly 40.

Body panel 10 includes layer assembly 20 which has multiple layers combined therein. Layer assembly 20 includes a surfacing veil layer 22, a first cloth layer 24, a mat layer 26 and a second cloth layer 28. First cloth layer 24 and second cloth layer 28 being e-glass. First cloth layer 24 and second cloth layer 28 may preferably be a light weight woven composite material. The combination of surfacing veil layer 22, first cloth layer 24, mat layer 26 and second cloth layer 28 results in a fibrous sheet 29. Surfacing veil layer 22 may be used to give fibrous sheet 29 a smooth top surface texture. The smooth top surface helps with painting and aesthetics as it allows for fibrous sheet 29 to appear more appealing. Thereby, in one embodiment, surfacing veil layer 22 may not be necessary to use in combination with first cloth layer 24, mat layer 26 and second cloth layer 28 to create fibrous sheet 29. Surfacing veil layer 22 may allow for fibrous sheet 29 to be easily painted as desired by a user. Layer assembly 20 may further include a customization layer 31 of fiber glass, Kevlar, carbon fiber or combinations thereof. Customization layer 31 may be any other suitable material that the user would like to use in order to change the aesthetics and looks of the present invention. Customization layer 31 may preferably be mounted atop of fibrous sheet 29. It may be preferable for all layers of layer assembly 20 to be made of a same material. However, the layers are put in place differently to allow for the distinct characteristics of each layer.

Importantly, first cloth layer 24, mat layer 26, and second cloth layer 28 may be combined and layered on top of each other with a resin. First cloth layer 24 may be placed down and it may be a woven piece of material. First cloth layer 24 may then be covered with the resin. Mat layer 26 is then placed atop of first cloth layer 24. Mat layer 26 may be made of shredded material that may be placed down onto first cloth layer 24 piece by piece. Mat layer 26 may then be covered with resin. Subsequently, second cloth layer 28 may be placed atop of mat layer 26 that is covered with resin. First cloth layer 24 and second cloth layer 28 may be similar. It should be understood that first cloth layer 24, mat layer 26, and second cloth layer 28 may be made of a same material. Once resin has set and dried layer assembly 20 may be ready. It should be understood that upon first cloth layer 24, mat layer 26, and second cloth layer 28 being layered they are molded as needed to replace the required panel. That is to mean that the layers are placed on top of each other in the shape of the panel they are to replace so that once resin has set the layers are molded in a proper shape. In one embodiment, surfacing veil layer 22 may be place with resin onto first cloth layer 24, mat layer 26 and second cloth layer 28 to result in fibrous sheet 29 which has a smooth top surface. Before fibrous sheet 29 has dried it may be molded into the necessary shape to replace a damaged panel on vehicle body 44 of a vehicle 42 of vehicle assembly 40. It should be understood that fibrous sheet 29 may be of a predetermined dimension as per the needs of a user. It may be necessary to further smoothen fibrous sheet 29 through sanding means for proper painting thereof. The present invention can be entirely customized as per the wished of the user. That customization may be in the form of color, shape or size. Fibrous sheet 29 can be easily made to take any shape to replace any damaged portion of vehicle 42.

Body panel 10 results in important properties being achieved. Body panel 10 is very lightweight. Making it easy to transport body panel 10 especially if body panel 10 is large. Body panel 10 is lighter than the standard sheet metal used for typical vehicle body 44. Despite being very light body panel 10 may still be very durable. Much more durable than current materials used for vehicles. Body panel 10 does not contain any metal and as such it may not rust. Rust is the culprit for a majority of vehicle body 44 becoming damaged. Body panel 10 may also be very durable as body panel 10 may not dent and is also flexible. Which is very advantageous since vehicle body 44 may become easily damaged due to a crash or other similar collision. Body panel 10 may be a suitable replacement for portions of vehicle body 44 that are damaged as it may otherwise look identical when painted an appropriate color while being more durable. The durability of body panel 10 also may allow for less required maintenance.

To replace damaged portions of vehicle body 44, body panel 10 may be used as follows. Firstly, fibrous sheet 29 is made as needed of a necessary shape and size. Fibrous sheet 29 may then be molded as its layers are being placed on top of each other. Body panel 10 is to go in place a damaged body panel on vehicle body 44. Once the damaged body panel has been removed, then a body panel opening 46 is created. Body panel 10 is to cover body panel opening 46. Attaching flaps 45 are located on the inside of body panel opening 46 along the inner perimeter of vehicle body 44 where body panel opening 46 is. Fibrous sheet 29 may be mounted to attaching flaps 45. Thereafter the majority of body panel 10 is placed within body panel opening 46 and is flush with the rest of vehicle body 44. Fibrous sheet 29 is mounted to attaching flaps 45 of vehicle body 44 with an adhesive preferably. Attaching flaps 45 may only be visible from an inside of vehicle body, as only fibrous sheet 29 is seen once the present invention has been mounted to cover body panel opening 46. The adhesive has to set before the process is complete. As such it may be necessary to clamp together attaching flaps 33 with vehicle body 44 until the adhesive has set to bond body panel 10 to vehicle body 44. This results in previously damaged panels of vehicle body 44 being replaced.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for body panels, comprising:
    a. a layer assembly including an attaching flap and a fibrous sheet having a first cloth layer, a mat layer and a second cloth layer, said mat layer is sandwiched therebetween said first cloth layer and said second cloth layer, said first cloth layer, said mat layer and said second cloth layer being molded to a predetermined shape and bonded together with resin resulting in said fibrous sheet;
    b. a vehicle assembly including a vehicle having a vehicle body and a body panel opening, the fibrous sheet being adhesively mounted to an interior side of the body panel opening, said fibrous sheet having dimensions greater than a perimeter of the body panel opening and entirely concealing said body panel opening when secured thereto, the attaching flap being adhesively mounted to a fibrous sheet perimeter thereby completely framing the fibrous sheet, said attaching flap and fibrous sheet being mounted flush onto an interior side of the body panel opening, wherein the adhesive dries thereby solidifying the fibrous sheet and the attaching flap and securing said fibrous sheet and said attaching flap to the interior side of the body panel opening, the fibrous sheet being between the interior side of the body panel opening and the attaching flap.

2. The system of claim 1, wherein said fibrous sheet is mounted to said vehicle to cover said body panel opening with an adhesive.

3. The system of claim 1, wherein said layer assembly is rust free.

4. The system of claim 1, wherein said layer assembly is entirely dent resistant.

5. The system of claim 1, wherein said fibrous sheet includes fiber glass, carbon fiber, Kevlar or combinations thereof.

6. The system of claim 1, wherein said fibrous sheet includes a surfacing veil layer as a top layer for providing a smooth surface to said fibrous sheet.

7. The system of claim 1, wherein said fibrous sheet includes a customization layer of carbon fiber, Kevlar or combinations thereof for visual appeal.

8. The system of claim 1, wherein said body panels can be customized in color or design.

9. The system of claim 1, wherein said said fibrous sheet being of a predetermined shape and a predetermined size which matches a predetermined shape and a predetermined size of said body panel opening to allow said fibrous sheet to be mounted flushly with said body panel opening.

10. The system of claim 1, wherein said first cloth layer, said second cloth layer, and said mat layer being of a same material.

11. The system of claim 1, wherein mat layer is shredded material covered by said resin.

12. The system of claim 1, wherein resin is in between each of said first cloth layer, said mat layer and said second cloth layer.

13. A system for body panels, consisting of:
    a. a layer assembly including a fibrous sheet having a first cloth layer, a mat layer and a second cloth layer, said mat layer is sandwiched therebetween said first cloth layer and said second cloth layer, the first cloth layer and the second cloth layer being made of a woven material, wherein a resin is located between each of said first cloth layer, the mat layer, and the second cloth layer, the mat layer being made of a shredded material covered by said resin, said first cloth layer, said mat layer and said second cloth layer being molded to a predetermined shape and bonded together with resin resulting in said fibrous sheet, the fibrous sheet including a surfacing veil layer defining a top layer, wherein the veil layer includes a smooth surface configured to allow paint to adhere thereon;

b. a vehicle assembly including a vehicle having a vehicle body and a body panel opening, the fibrous sheet being adhesively mounted to an interior side of the body panel opening, said fibrous sheet having dimensions greater than a perimeter of the body panel opening and entirely concealing said body panel opening when secured thereto, the fibrous sheet being mounted to the vehicle to cover said body panel opening with an adhesive, said fibrous sheet being mounted flush onto an interior side of the body panel opening, wherein the adhesive dries thereby solidifying the fibrous sheet and securing said fibrous sheet to the interior side of the body panel opening, the fibrous sheet being dent resistant once solidified.

\* \* \* \* \*